US006678945B2

(12) United States Patent
Eaton et al.

(10) Patent No.: US 6,678,945 B2
(45) **Date of Patent: *Jan. 20, 2004**

(54) BACKSIDE PIN REMOVAL TOOL

(75) Inventors: Michael Lee Eaton, Pine Island, MN (US); Gregory Jay Geilow, Eyota, MN (US); Michael Lee Graham, Rochester, MN (US); Jeffrey C. Shonkwiler, Saint Bonifacius, MN (US)

(73) Assignee: International Business Machnies Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 10/116,227

(22) Filed: Apr. 4, 2002

(65) Prior Publication Data

US 2003/0188424 A1 Oct. 9, 2003

(51) Int. Cl.[7] .................. B23P 19/00

(52) U.S. Cl. .................. 29/762; 29/764; 29/758; 29/739

(58) Field of Search .................. 29/762, 764, 758, 29/747, 752, 854, 857, 278, 426.5, 825; 279/46.3; 439/744; 81/445, 345, 441; 7/107, 158, 166

(56) References Cited

U.S. PATENT DOCUMENTS 2,896,209 A * 7/1959 Hilti .................. 1/47
4,070,755 A 1/1978 Carter .................. 29/764
4,168,569 A * 9/1979 Fairbairn .................. 29/764
4,872,259 A * 10/1989 Jones et al. .................. 29/764
6,568,070 B1 * 5/2003 Eaton et al. .................. 29/762

* cited by examiner

*Primary Examiner*—Peter Vo
*Assistant Examiner*—M. Trinh
(74) *Attorney, Agent, or Firm*—Robert W. Lahtinen; Robert R. Williams

(57) ABSTRACT

A tool is described for the backside removal of single pins from a high pin density connector, either from the connector itself or a connector with pins such as compliant pins mounted in plated through vias on a host such as a printed circuit board. A pin is driven from a connector by advancing a sleeve portion to surround the pin and subsequently pushing the pin from the connector using a shaft with a spherical, concave end surface, whereby the pin is radially confined by the sleeve and aligned and driven by the shaft as it is advanced through the sleeve. Where the connector is mounted on a printed circuit board with the pin resident in a plated through via, the sleeve is aligned with and abutting the printed circuit board at the via opening and the shaft is thereafter advanced through and beyond the sleeve to engage, align and drive the pin with the via wall providing radial confinement.

11 Claims, 5 Drawing Sheets

BACKSIDE PIN REMOVAL TOOL

This invention pertains to tools for the removal of a single pin form a high density matrix of pins presented by an electrical connector and more particularly to a tool for the backside removal of a single pin that is effective to remove compliant pins.

BACKGROUND OF THE INVENTION

The use of high density connectors with closely spaced rows and columns of connector pins and especially those with compliant connector pins, brings the requirement that highly populated connectors be repairable to reclaim such complex and expensive devices by the replacement of one or a few damaged pins. The removal of a single connector pin is not difficult in a low pin density connector which can tolerate the use of a simple tool such as long nose pliers to clamp about and seize a pin for extraction. Many common extraction devices seize a pin or grasp a pin behind an enlarged portion to allow the pin to be pulled out in unison with the extracting tool. Another approach is the use of a tool with the jaws of a chuck that are positioned around the pin and constricted by a sleeve or other means to capture the pin. None of these devices or techniques have been found effective for the removal of pins where the center to center spacing of adjacent pins is about 2 millimeter and the space between adjoining pin surfaces is no more than 1 millimeter. In such an environment, it is difficult to remove one pin without damaging one or more adjacent pins.

Even where a device or tool is capable of extracting a pin from a high density pin matrix, it is useless if the reason for replacement is that the pin is broken off or missing making it impossible to seize and pull out the pin. When only the compliant pin portion extending from the back side of the connector is available, it is necessary to have a tool that is capable of driving the pin from the connector. Further, since compliant pin connectors are commonly not reliably removed and reinstalled, it is necessary that a tool for the backside removal of a single pin be capable of removing a pin from either the uninstalled connector or from an installed connector having the compliant connector portions received in the plated vias of a host device such as a printed circuit board.

SUMMARY OF THE INVENTION

The pin removal tool of the present invention includes a thin wall sleeve that can be received about a pin in a high density matrix of pin rows and columns, without compromising an adjacent pin. With the sleeve advanced to surround the pin and abut the connector body, a shaft, which is substantially the same diameter as the inner wall of the sleeve, is advanced through the sleeve to engage the surrounded pin and drive it from the connector body wall portion through which it extends. To assure that the shaft does not become wedged between the pin and the sleeve, the shaft end surface is concave, presenting a substantially hemispherically recessed surface which engages and aligns the pin allowing a substantially axial force to be applied to the pin.

The same tool is effective when the connector is installed with the compliant connector portions resident in plated through vias formed in a printed circuit board or other host device. In this environment, the sleeve is aligned with the via from which the pin is to be removed with the precise final alignment achieved when the shaft end is received in the via opening. With the sleeve end surface abutting the host printed circuit board, the shaft is advance through the via to drive the pin from the via and permit final withdrawal from the front side. In this environment, the walls forming the via provide radial confinement of the pin as the shaft is advanced during pin removal.

DETAILED DESCRIPTION

Figure 1:
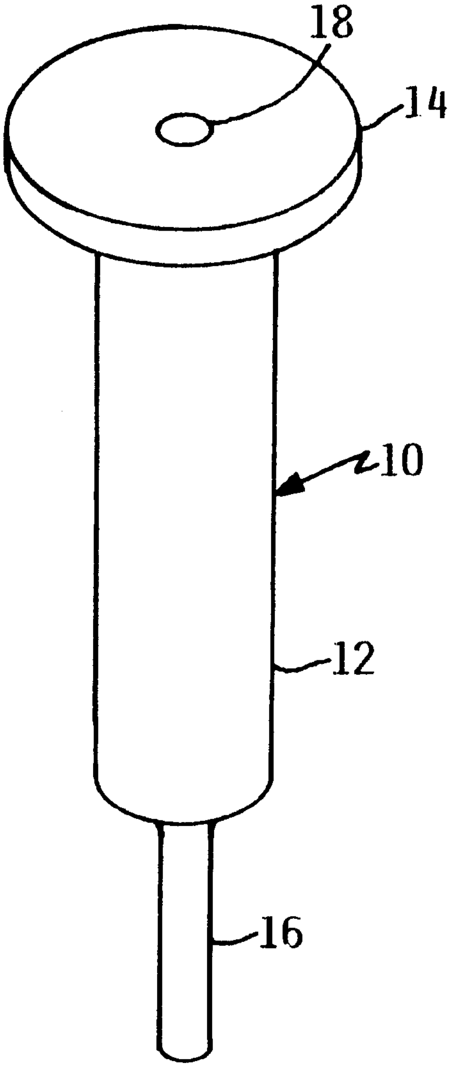
FIG. 1 is a perspective view of the body portion of the backside pin removal tool of the present invention.
Figure 2:
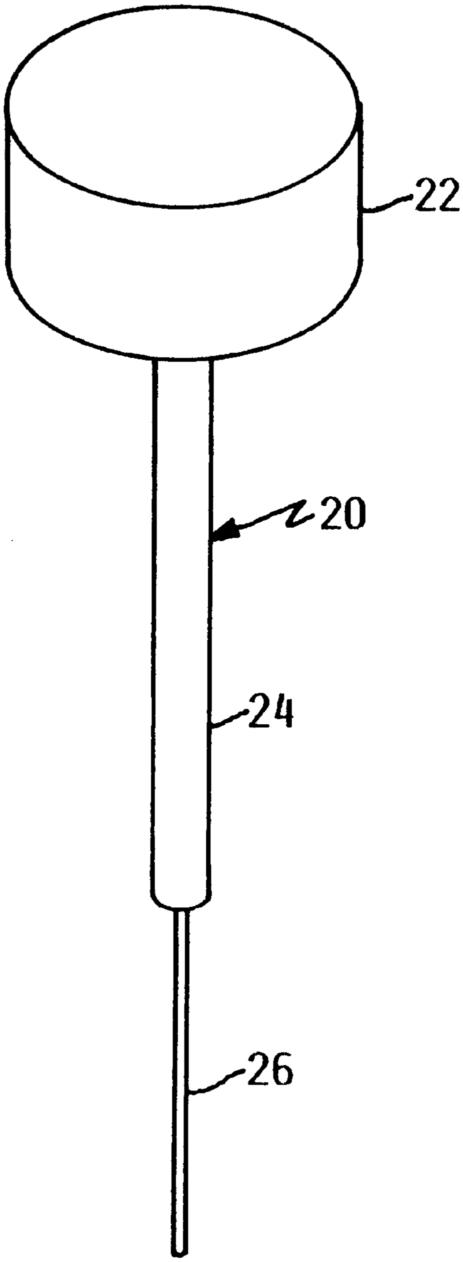
FIG. 2 is a perspective view of the plunger portion of the pin removal tool of the present invention.

The backside pin removal tool of the present invention includes two principal members. FIG. 1 shows a body member 10 that includes a central portion 12 with a flange 14 at one end and a thin wall sleeve 16 formed as an integral portion at the opposite end. A central bore 18 extends through the length of body member 10. FIG. 2 shows a plunger 20 having a flange 22 at the upper terminal end from which extends a shaft 24 with an integral reduced diameter portion 26 at the lower end as shown.

Figure 3:
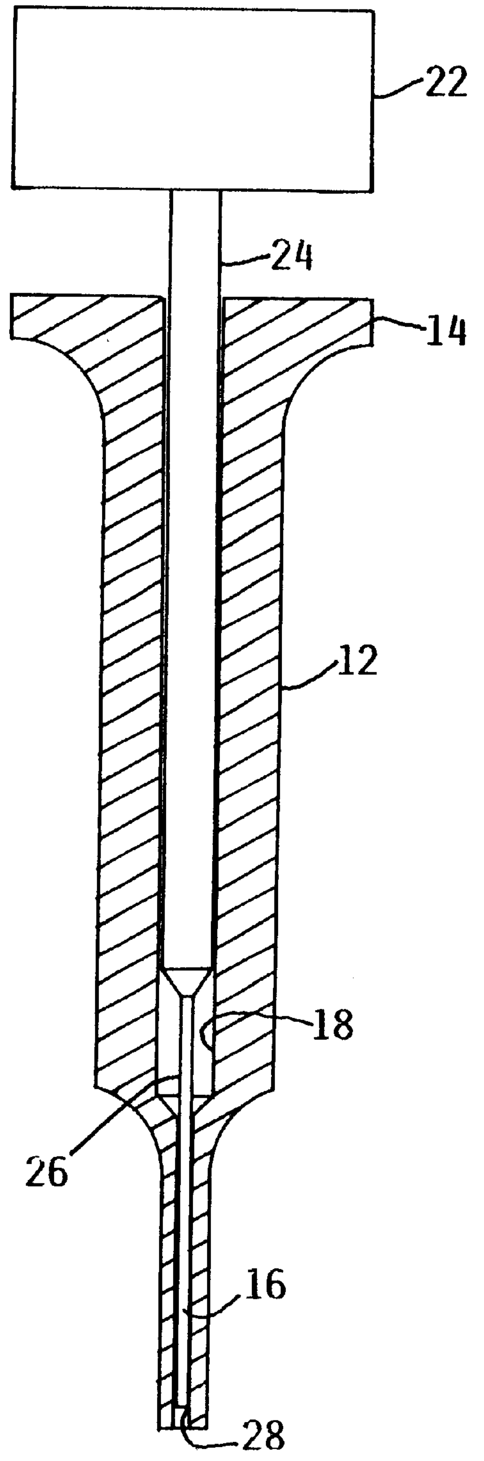
FIG. 3 is a side elevation of the assembled pin removal tool with the body portion shown in axial section.
Figure 4:
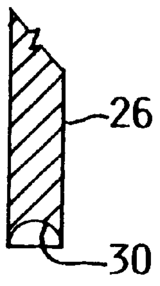
FIG. 4 is a detail view of the plunger shaft terminal end showing the concave spherical end surface which spans the entire diameter.
Figure 5:
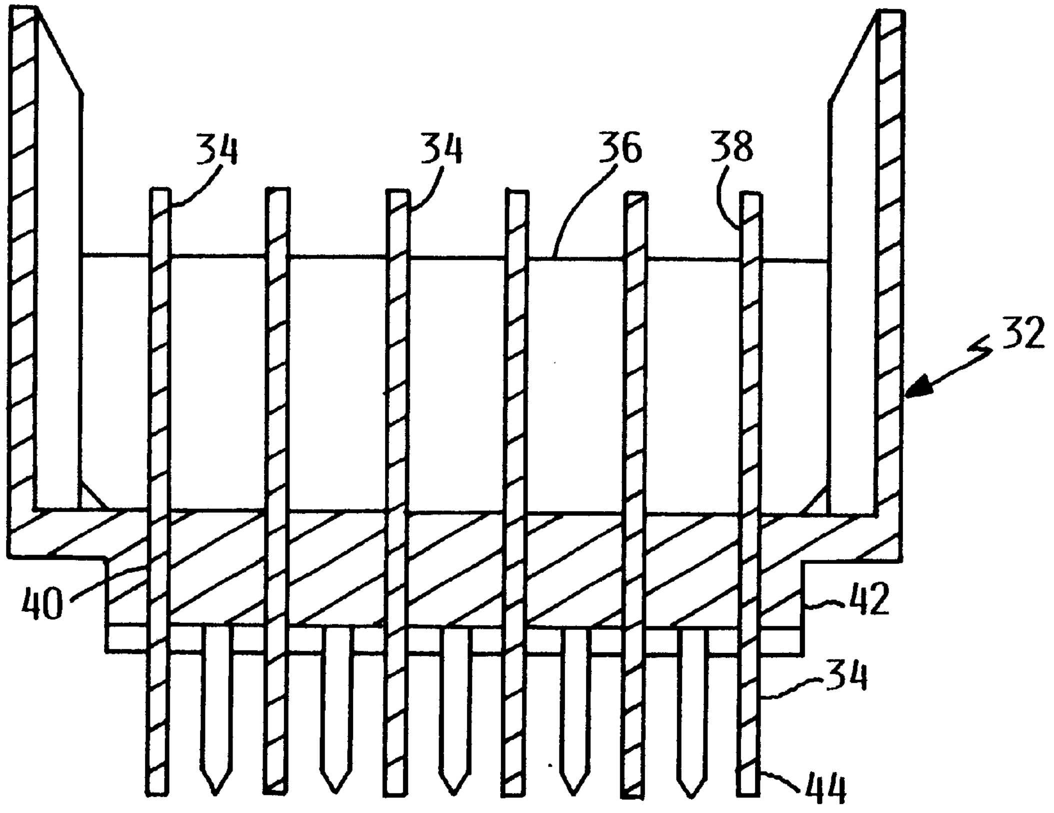
FIG. 5 is a vertical section of a typical high pin density connector taken through a row of connector pins.

FIG. 3 illustrates the plunger 20 with the shaft 24 and reduced diameter shaft portion 26 received in the central bore 18 of body member 10 (shown in axial section). Plunger 20 is axially movable with respect to body member 10 with the enlarged diameter portion of shaft 24 received and closely confined within the bore 18 and the reduced diameter shaft portion 26 received in and closely confined by the cylindrical inner wall surface 28 of body member sleeve 16. In the detail showing of FIG. 4, the terminal end of the reduced diameter shaft is illustrated in axial section. The lower end of shaft 26 includes a concave, substantially spherical surface which spans the entire diameter of the end surface FIG. 5 is a much enlarged section view of a typical high density connector 32 employing rows and columns of compliant connector pins 34. The view is a section taken through a row of connector pins 34. Typically such connectors have twenty five 6 or 8 pin rows to include 150 or 200 connector pins in each connector with multiple connectors aligned to present 600 or more pin connections at a location. The connector shown also includes a shield or blade 36 between each adjoining pair of 6 pin rows, which further reduces the clearance about adjacent pins 34. Each pin 34 includes an upper pin contact 38, a central portion 40 which is embedded in and captured by the electrically insulating connector body 42, and a lower compliant connector portion 44 which in use is received in a plated through via in a host device such as a printed circuit board. In the actual connector device, adjoining pins 34, in rows of six and columns of twenty five, have center line to center line spacings of about 2 millimeters. The space between adjacent pin surfaces is about 1 milimeter. Thus, any tool portion that must engage a pin (in the present device, sleeve 16) must have a minimal external dimension to avoid damage to adjacent pins.

Figure 6:
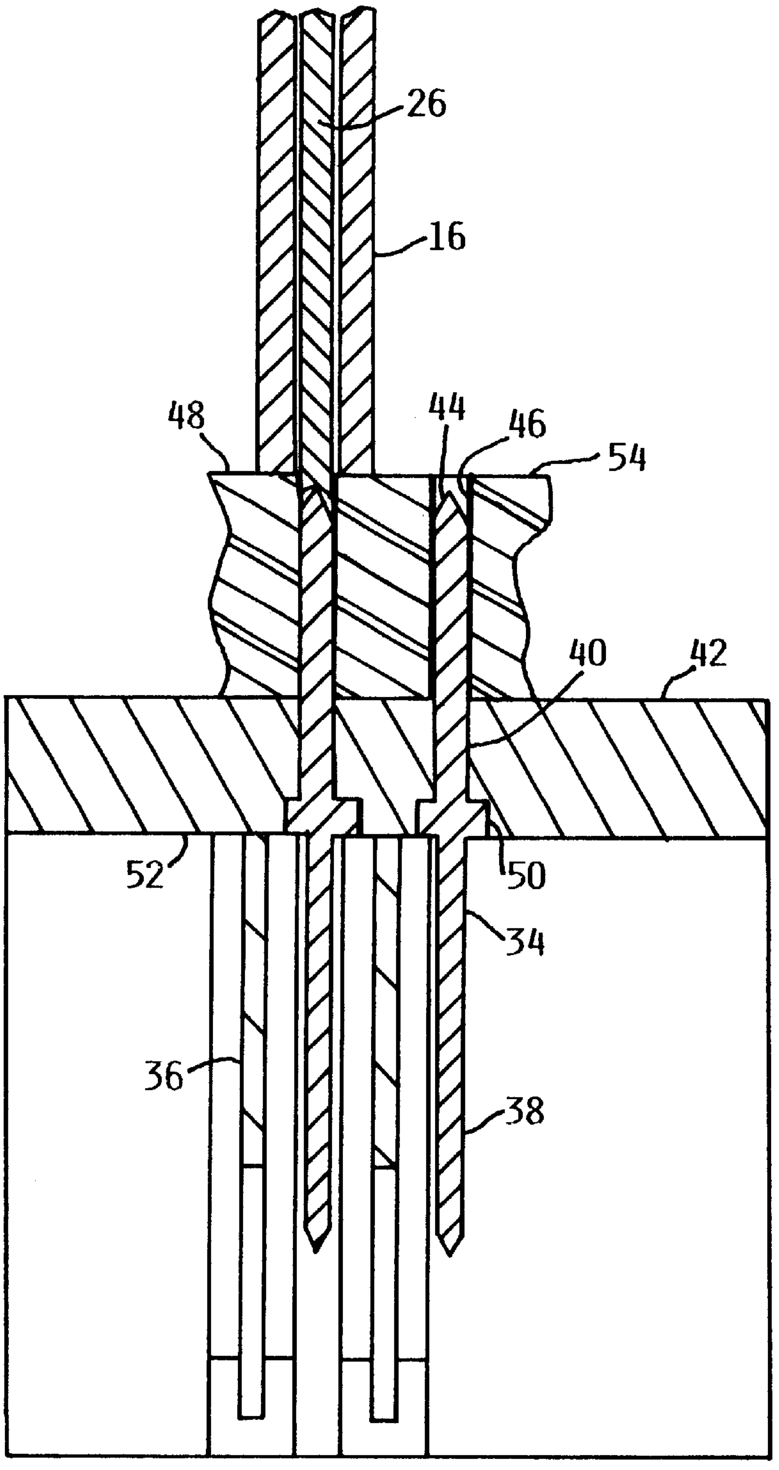
FIG. 6 is a partial section view of a connector attached to a printed circuit board with the removal tool sleeve and shaft positioned to effect removal of a single pin.
Figure 7:
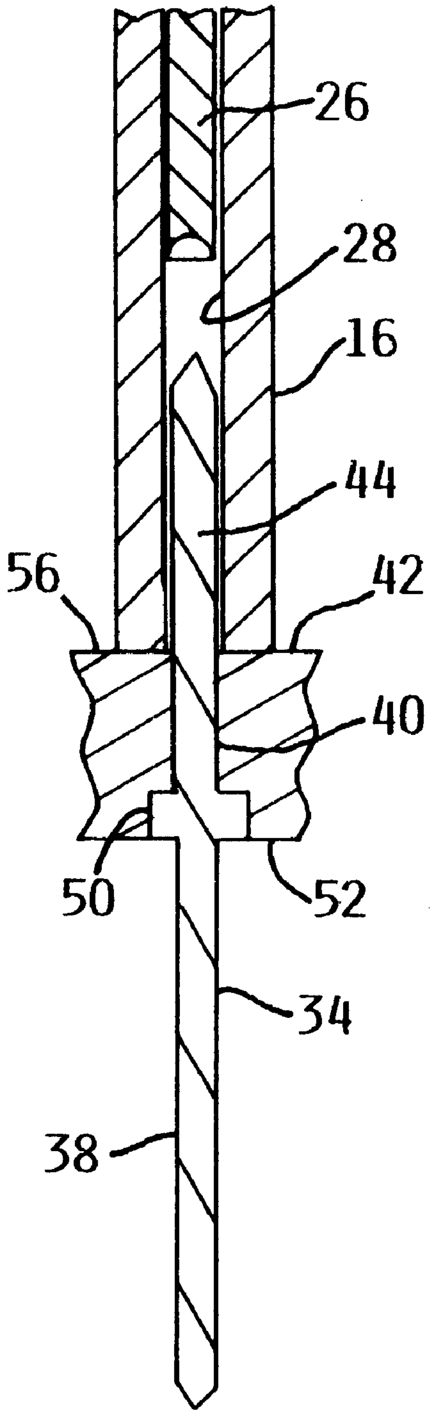
FIG. 7 is a partial section of a connector showing a single pin with end portions of the tool sleeve and shaft positioned to effect backside removal of the pin.

FIGS. 6 and 7 illustrate the use of the tool described herein to effect backside removal of a compliant connector pin. The technique of choice for pin removal is front side extraction effected by seizing and pulling the pin from the connector body. However, when the front side portion of the pin is damaged or broken away, it is only possible to remove the pin from the backside (from the lower surface of the connector body as seen in FIG. 5). FIGS. 6 and 7 show the connector of FIG. 5 inverted with the removal tool above the inverted connector to effect removal by pushing the selected pin downward to disengage the pin from the connector. FIG. 6 illustrates the backside removal of a pin 34 from a connector body mounted on a printed circuit board by having compliant pin connector portions received in plated through vias in the printed circuit board. FIG. 7 shows the use of the tool to effect backside removal of a pin from an uninstalled connector.

In FIG. 6, the inverted connector presents connector pins 34 which have a front side pin connector portion 38; a backside compliant connector portion 44, received in plated through vias 46 in a printed circuit board 48; and an intermediate portion 40 captured in an electrically insulating body member 42. Pin intermediate portion 40 includes an enlarged portion 50 adjacent the surface 52 of body 42. Intermediate rows of pins 34 are shields or blades 36. To remove a single pin 34 from the connector, the sleeve 16 of the tool is aligned with the via opening in printed circuit board 48 in which the pin to be removed is resident. Final alignment is achieved by finding the via opening with the tool shaft 26 and causing the shaft to enter the via. With the sleeve 16 abutting the printed circuit board surface 54 the shaft 26 is advanced to push the pin 34 from the assembled connector and printed circuit board 48. As shaft 26 is advanced, the spherically concave end surface 30 engages and aligns the end of the pin compliant connector portion 44 while the printed circuit board via 46 closely confines the pin, to enable the pin to be pushed through the connector body wall 42.

The section view of a single pin and tool sleeve assembly of FIG. 7 show the use of the single pin removal tool to effect the backside removal of a pin from an uninstalled connector. When removing a pin 34 from the connector, the tool sleeve portion 16 is aligned with the compliant connector portion 44 of the selected pin and advanced until the end surface abuts the connector body wall surface 56. The shaft 26 is then advanced causing the spherical end surface 30 to engage and align the pin and force the pin from the connector body wall 42. In this mode of using the tool, the sleeve 16 inner surface 28 radially confines the pin compliant connector portion 44.

The foregoing description of an embodiment of the invention has been presented for purposes of illustration and description. It is not intended to be exhaustive or limit the invention to the precise form disclosed. Many modifications and variations are possible in light of the above teaching. It is intended that the scope of the invention be limited not by the description and illustrations, but rather by the claims appended hereto.

What is claimed is:

1. A pin removal tool for removing a single pin from a multiple pin electrical connector comprising:

a body member having a central bore and a thin wall sleeve portion extending at a first terminal end;

a plunger member, received in and axially movable within said bore, including a shaft, at a first terminal end, received in said body member sleeve and axially movable within said sleeve; and a concave terminal end surface presented by said shaft which is movable through said sleeve to engage and align the pin of the electrical connector with said sleeve for removing the pin from the electrical connector.

2. The single pin removal tool of claim 1 wherein said plunger includes a flange at the end opposite said plunger first terminal end and said plunger is axially movable within said body member to extend said shaft beyond the end of said sleeve, whereby the pin captured by a connector body of the electrical connector and resident in a via in a host apparatus can be aligned with said body member sleeve end when said sleeve end surface abuts said host apparatus at the opening to said via and said shaft can subsequently be advanced to engage and drive the pin within the via and disconnect the pin from the connector body.

3. The single pin removal tool of claim 2 wherein said plunger shaft first terminal end concave surface is substantially spherical and spans the entire end surface of said shaft.

4. The single pin removal tool of claim 1 wherein said plunger includes a flange at the plunger end opposite said first terminal end and said plunger is retractable to withdraw said shaft within said sleeve, whereby said body member can be positioned to align said sleeve with a connector pin to be removed and be advanced to cause said sleeve to surround said pin with the end of said sleeve abutting the body of said connector, following which said shaft can be advanced to have said concave terminal end surface engage and drive said pin from its position of capture by the body of said connector.

5. The single pin removal tool of claim 4 wherein said plunger shaft first terminal end concave surface is substantially spherical and spans the entire end surface of said shaft.

6. A pin removal tool for removing a single pin from a multiple pin electrical connector comprising:

a body member having an axial bore extending therethrough, said body member having a thin wall sleeve portion at a first terminal end, said bore having a first diameter through a portion of its axial length and a reduced diameter portion defined by the inner wall surface of said sleeve portion;

a plunger member including a shaft with a first diameter that is slidably received within said body member bore first diameter portion and a reduced diameter terminal end portion that is slidably received in said body member sleeve reduced diameter; and a concave surface presented at the terminal end of said plunger member reduced diameter terminal end portion, the concave surface suitable for engaging a first end of the pin for removal of the pin from the electrical connector.

7. The single pin removal tool of claim 6 wherein said plunger member shaft is slidable within said body member central bore between a first position wherein said plunger shaft reduced diameter end portion projects beyond the terminal end of said body member sleeve portion and a second position wherein said plunger shaft reduced diameter end portion is retracted within said body member sleeve, whereby said plunger can be advanced to remove the pin from the electrical connector when the pin is confined in a host apparatus or when the pin is not confined in a host apparatus and the pin is surrounded by said sleeve.

8. The single pin removal tool of claim 7 wherein said plunger concave terminal end surface is substantially spherical and spans the entire diameter of said reduced diameter shaft portion end surface.

9. The single pin removal tool of claim 8 wherein said plunger shaft first diameter portion and said shaft reduced diameter terminal end portion are formed as a single integral part and said plunger member further includes a flange portion secured to said shaft at the end opposite said reduced diameter terminal end portion.

10. A pin removal tool for removing a single pin from the connector body of a multiple pin electrical connector comprising:

a single piece integral body member having a central bore extending therethrough, said body member having a flange at one end, an intermediate portion, and a reduced diameter portion at the end opposite said one end;

said bore having a first diameter within said flange and said intermediate portion and a reduced diameter within said reduced diameter portion which forms a thin wall sleeve terminal end portion; and a plunger member including a shaft having a first diameter portion received in and slidable within said body member first diameter bore and a reduced diameter portion extending axially therefrom and received in said body member sleeve terminal end portion, said reduced diameter shaft portion having a concave terminal end surface;

said plunger shaft reduced diameter portion being retractable into said body member sleeve terminal end portion when moved in one axial direction and slidable in the direction opposite said one axial direction to project beyond the distal end of said body member sleeve terminal end portion, whereby when said body member sleeve surrounds a pin to be removed, said shaft can be advanced to align and drive the pin from the connector body and when the pin is resident in a host device via, said body member sleeve can be aligned with the via and the plunger shaft advanced to cause said shaft reduced diameter portion to extend into the via beyond the sleeve end to align and drive, from the connector body, the pin which is radially confined by the walls forming the via.

11. The pin removal tool of claim 10 wherein said plunger member includes a flange at the shaft end opposite the reduced diameter shaft portion and said concave terminal end surface is a hemispherical surface which spans the entire diameter of said shaft portion terminal end surface and is symmetrical about the axis of said shaft.

* * * * *